(12) United States Patent
Nauseda et al.

(10) Patent No.: US 9,572,426 B1
(45) Date of Patent: Feb. 21, 2017

(54) FABRIC PODS

(71) Applicant: Amazon Technologies, Inc., Seattle, WA (US)

(72) Inventors: Curtis H. Nauseda, Maynard, MA (US); Matthew David Verminski, North Andover, MA (US); Timothy Aaron Bragg, Woburn, MA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/489,278

(22) Filed: Sep. 17, 2014

Related U.S. Application Data

(60) Provisional application No. 61/902,766, filed on Nov. 11, 2013.

(51) Int. Cl.
| | | |
|---|---|---|
| *A47B 43/00* | (2006.01) | |
| *A47B 47/06* | (2006.01) | |
| *A47B 47/00* | (2006.01) | |
| *A47B 57/00* | (2006.01) | |
| *A47B 81/00* | (2006.01) | |
| *B60B 33/00* | (2006.01) | |

(52) U.S. Cl.
CPC .......... *A47B 47/06* (2013.01); *A47B 47/0083* (2013.01); *A47B 57/00* (2013.01); *A47B 81/00* (2013.01); *B60B 33/00* (2013.01); *A47B 43/00* (2013.01); *A47B 47/00* (2013.01)

(58) Field of Classification Search
CPC ..... A47B 47/06; A47B 47/0083; A47B 57/00; A47B 81/00; A47B 43/00; A47B 47/00; B60B 33/00

USPC . 211/195, 189, 85.15, 85, 149, 10; 312/3–6; 220/9.1–9.4; 414/331.06
See application file for complete search history.

(56) References Cited

U.S. PATENT DOCUMENTS

| | | | | |
|---|---|---|---|---|
| 775,766 | A * | 11/1904 | Abercrombie | A47B 3/00 108/162 |
| 937,659 | A * | 10/1909 | Todd | A47B 43/04 108/164 |
| 1,216,250 | A * | 2/1917 | Bittle | A47B 43/04 211/10 |
| 1,808,946 | A * | 6/1931 | Draper | E04H 1/1255 312/6 |
| 4,066,089 | A * | 1/1978 | Rainwater | E04H 15/48 135/114 |
| 5,957,310 | A * | 9/1999 | Mitchell | A47B 43/00 211/149 |
| 6,089,394 | A * | 7/2000 | Ziglar | D06F 95/002 220/6 |
| 6,213,315 | B1 * | 4/2001 | Forney | B65B 69/0083 211/194 |
| 6,305,764 | B1 * | 10/2001 | Kortman | A47B 43/00 108/162 |
| 6,318,822 | B1 * | 11/2001 | Wang | A47B 43/003 108/149 |
| 6,390,573 | B1 * | 5/2002 | Wang | A47B 61/00 108/149 |

(Continued)

*Primary Examiner* — Joshua J Michener
*Assistant Examiner* — Devin Barnett
(74) *Attorney, Agent, or Firm* — Lee & Hayes, PLLC

(57) ABSTRACT

In an infrastructure that uses a mobile order fulfillment system, mobile drive units may be dispatched and instructed to bring inventory holders that include fabric pods to a workstation where at least one of the inventory holders may be operated upon. Such fabric pods may include one or more fabric bin arrays.

13 Claims, 11 Drawing Sheets

(56) References Cited

U.S. PATENT DOCUMENTS

| | | | | |
|---|---|---|---|---|
| 6,719,157 B2* | 4/2004 | Stoddart | ............... | A47B 43/00 211/118 |
| 7,402,018 B2* | 7/2008 | Mountz | ................. | B60D 1/465 211/95 |
| 7,681,728 B2* | 3/2010 | Sabounjian | .......... | A45C 7/0077 206/278.1 |
| 7,748,803 B2* | 7/2010 | Bazany | ................. | A47F 5/0093 108/143 |
| 8,459,473 B2* | 6/2013 | Wang | ................... | A47B 43/003 211/118 |
| 8,540,089 B2* | 9/2013 | Wang | ................... | A47B 43/003 211/118 |
| 8,607,978 B2* | 12/2013 | Bradford | ............... | B65D 19/44 206/335 |
| 8,972,045 B1* | 3/2015 | Mountz | ............... | B65G 1/1373 700/213 |
| 9,010,563 B2* | 4/2015 | Bradford | ............... | B65D 19/06 220/535 |
| 9,073,665 B2* | 7/2015 | Sanger | ................... | B65G 65/00 |
| 9,422,081 B2* | 8/2016 | Bublitz | ................. | B65D 19/06 |
| 2003/0057171 A1* | 3/2003 | Wang | ..................... | A47B 43/00 211/195 |
| 2004/0251795 A1* | 12/2004 | Wang | ..................... | A47B 47/04 312/6 |
| 2006/0081490 A1* | 4/2006 | Bradford | ............... | B65D 19/18 206/386 |
| 2006/0138067 A1* | 6/2006 | Tourlamain | ............ | B65D 19/12 211/195 |
| 2010/0072085 A1* | 3/2010 | Nyeboer | ................ | B65D 25/04 206/175 |

* cited by examiner

, # FABRIC PODS

RELATED APPLICATIONS

The present application claims the benefit of U.S. Provisional Application Ser. No. 61/902,766, filed on Nov. 11, 2013, entitled "Fabric Pods", which is incorporated by reference herein in its entirety.

BACKGROUND

Modern inventory systems, such as those used in mail order warehouses, supply chain distribution centers, airport luggage systems, and custom-order manufacturing facilities, face significant challenges in responding to requests for inventory items. As inventory systems grow, the challenges of simultaneously completing large numbers of packing, storing, and other inventory-related tasks become non-trivial.

Increasingly, mobile order fulfillment systems are used within inventory facilities to address these and other concerns. A mobile order fulfillment system may provide automation for bringing ordered items to central workstations for workers to select and pack the ordered items in preparation for shipping. However, in inventory systems tasked with diverse inventory requests, inefficient utilization of storage space can result in lower throughput, unacceptably long response times, and, in general, poor system performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This application describes, in part, fabric-based pods or inventory holders ("fabric pods"), as well as techniques for use in an infrastructure that uses a mobile order fulfillment system in which mobile drive units, which in some instances may be robotic drive units, may be dispatched and instructed to bring inventory holders to a workstation and/or to store inventory holders in a storage area. The techniques may include applying an "identifiable pattern" or "image," such as a random pattern, to a floor surface of the infrastructure, from which a map may be created that associates locations within the infrastructure to different portions of the image. A mobile drive unit may then reference the map along with images of the floor surface captured by its imaging device, e.g., a camera, in order to determine its current location, as well as how to reach a desired destination. While in some examples, the fabric-based pods may be portable and mobile drive units may transport the fabric-based pods, in other examples, the fabric-based pods may not be transported by mobile drive units. Also, while in some examples, the fabric-based pods may be used in an inventory facility (e.g., a warehouse, a depot, distribution center, etc.), in other examples, the fabric-based pods may be used in a retail environment (e.g., a store, a brick and mortar store, a shopping mall, a marketplace, etc.).

Figure 1:
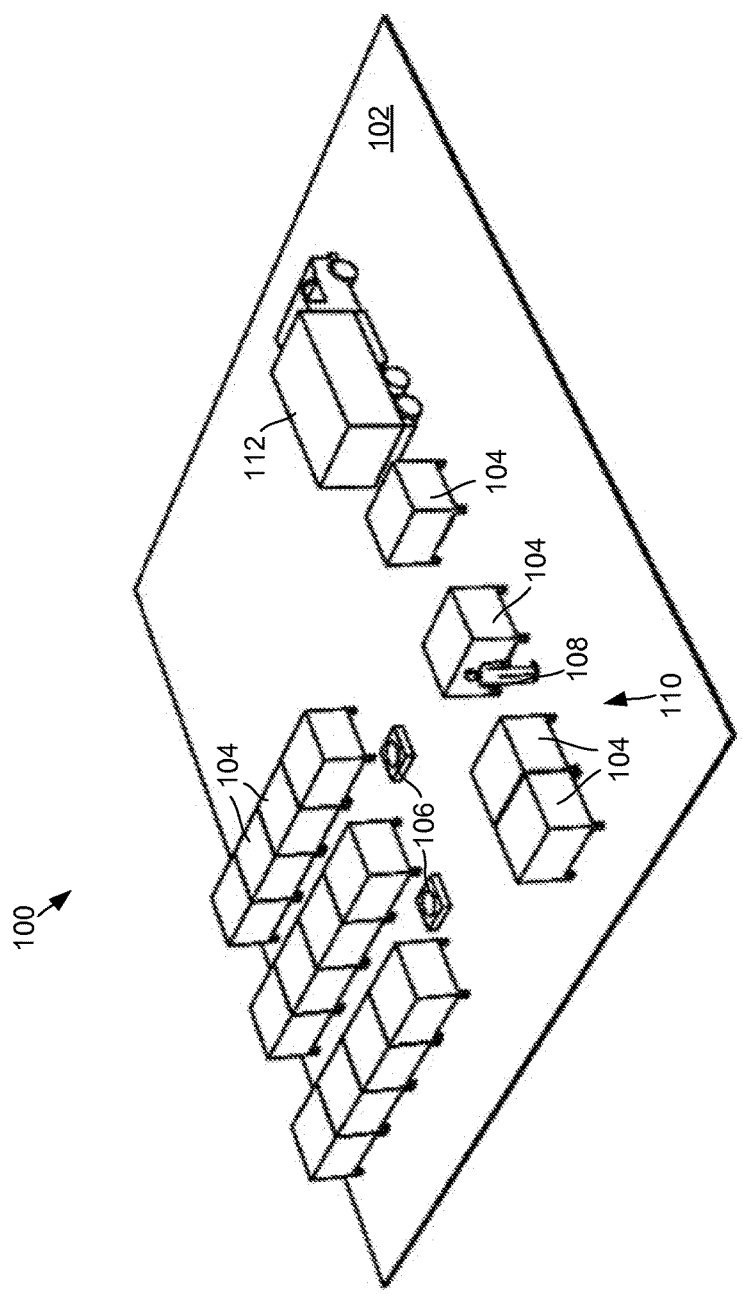
FIG. 1 is a perspective diagram of an inventory storage and order fulfillment system that includes an inventory facility, having a floor surface that may define an identifiable pattern, and multiple unmanned drive units that may navigate within the facility using the identifiable pattern on the floor.

FIG. 1 illustrates the components of an inventory storage and order fulfillment system or infrastructure 100 that includes an inventory facility 102 that is used to store inventory items that are ordered by and shipped to customers or other entities. In the described embodiment, the inventory facility 102 uses an automated mobile fulfillment system in which inventory items are stored in portable inventory holders 104 and moved about the facility 102 by mobile drive units. The mobile drive units may be "unmanned" or "robotic" drive units 106. While some mobile drive units 106 may be "unmanned"—and therefore do not transport a human—other mobile drive units (or simply "drive units") described herein may be configured to transport a human, regardless of whether that human controls the navigation of the corresponding drive unit. Within the illustrated environment, inventory holders 104 may be moved to a human worker 108 using the drive units 106 so that the worker can manually retrieve or "pick" ordered items from, store or "stow" inventory items into, or otherwise manipulate or adjust inventory items within, the inventory holders 104.

As a specific example, a received order may specify a plurality of inventory items. In response to such an order, the inventory holders 104 containing the inventory items are moved by the mobile drive units 106 to a workstation or other area 110 where the worker 108 retrieves the ordered items. In some implementations, inventory items retrieved in this manner may be placed on an additional inventory holder 104 that contains one or more outgoing orders. Once completed, the additional inventory holder 104 may be moved by a mobile drive unit 106 to a shipping workstation or other processing point. In addition, certain inventory holders 104 that have been loaded with specified inventory items may also be moved to or onto a transport vehicle for shipment to a different inventory facility.

As another example, inventory restocking may be performed when receiving new inventory at an inventory facility 102. The mobile fulfillment system identifies one or more inventory holders 104 that are to be used for storage of the incoming inventory items. For example, the one or more inventory holders 104 may include a unique identifier that the mobile fulfillment system utilizes to identify the one or more inventory holders 104. The mobile drive units 106 bring the identified inventory holders 104 to the worker 108 at the location of the new inventory. The worker 108 can then load the new inventory onto the inventory holders 104. After being loaded, mobile drive units 106 may be used to move the inventory holders 104 to appropriate locations within the inventory facility 102 for storage or to waiting transport vehicles for transport to different inventory facilities 102.

As described in further detail below, the mobile drive units 106 may include an imaging device, e.g., a camera, pointed substantially downwards for the purpose of capturing images of the floor surface of the inventory facility 102. In some instances, this floor surface may include an image (e.g., a random pattern or other image) that the mobile drive units 106 may utilize in order to navigate about the inventory facility 102. That is, the mobile drive units may reference a map that associates different locations of the facility 102 to different portions of the image on the floor. By doing so, the units 106 may compare the images captured by their respective cameras to the map to determine their current location, as well as to determine a path to reach a desired location.

Figure 2:
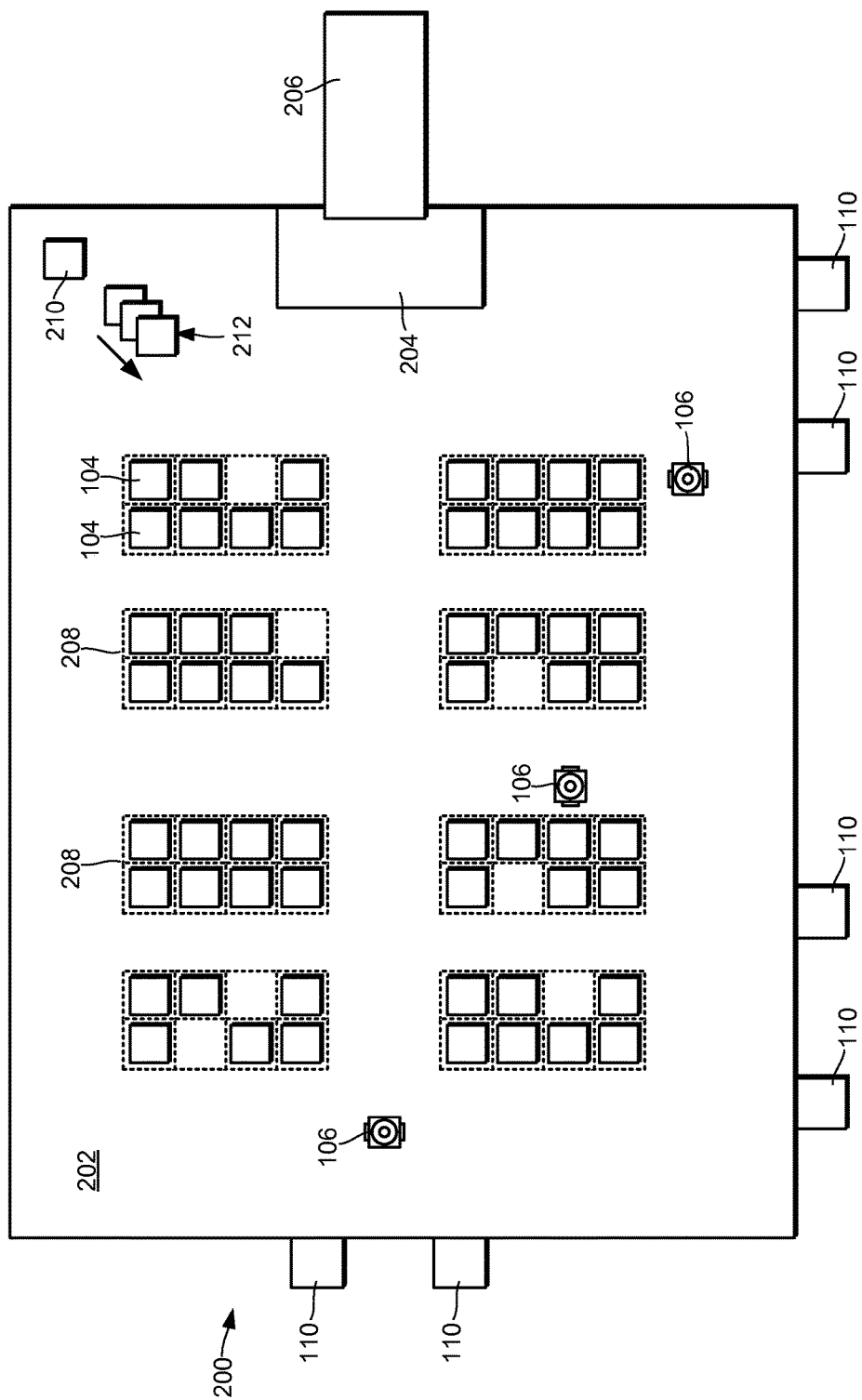
FIG. 2 is a block diagram illustrating an example configuration of an inventory management and order fulfillment system that may be implemented within the inventory facility of FIG. 1.

FIG. 2 illustrates an example configuration of an inventory management and/or order fulfillment system 200 that may be implemented in the inventory facility 102 described above. In the system 200 of FIG. 2, the mobile drive units 106 are used to transport the inventory holders 104 between points within a workspace 202 of an inventory facility. The workspace may include workstations 110, one or more loading docks 204, and cargo compartments 206 of one or more transport vehicles such as the transport vehicle 112 of FIG. 1. The workspace 202 may also include designated locations 208 for placement and storage of the inventory holders 104.

The mobile drive units 106 move the inventory holders 104 between locations within the workspace 202 under the general direction and control of a management component 210, which is also referred to herein as control logic 210. The management component 210 assigns tasks 212 to the mobile drive units 106 and other components of the system and coordinates operation of the mobile drive units 106 in completing the tasks 212. The tasks 212 may relate not only to the movement and processing of inventory holders 104, but also to the management and maintenance of the components of the system 200. For example, the management component 210 may assign portions of the workspace 202 as parking spaces for the mobile drive units 106, the scheduled recharge or replacement of mobile drive unit batteries, the storage of empty inventory holders 104, or any other operations associated with the functionality supported by the system 200 and its various components.

Although shown in FIG. 2 as a single, discrete component, the management component 210 may represent multiple components and may represent or include portions of the mobile drive units 106 or other elements of the system 200. As a result, any or all of the interaction between a particular mobile drive unit 106 and the management module 210 that is described below may in particular embodiments represent peer-to-peer communication between that mobile drive unit 106 and one or more other mobile drive units 106.

The mobile drive units 106 may comprise any devices or components appropriate for use in the system 200 based on the characteristics and configuration of the inventory holders 104 and/or other elements of the system 200. In a particular embodiment, the mobile drive units 106 are self-powered, wheeled devices configured to move autonomously about the workspace 202 without direct human supervision. In general, the mobile drive units 106 may be powered, propelled, and controlled in any manner appropriate based on the configuration and characteristics of the system 200.

The mobile drive units 106 may be capable of communicating with the management component 210 to receive information identifying selected inventory holders 104, to transmit the locations of the mobile drive units 106, and/or to exchange any other suitable information to be used by the management component 210 or the mobile drive units 106 during operation. The mobile drive units 106 may communicate with the management component 210 wirelessly, using wired connections between the mobile drive units 106 and the management component 210, and/or in any other appropriate manner. As one example, particular embodiments of the mobile drive unit 106 may communicate with the management component 210 and/or with one another using 802.11, Bluetooth, or Infrared Data Association (IrDA) standards, or any other appropriate wireless communication protocol. Furthermore, as noted above, the management component 210 may include components of individual mobile drive units 106. Thus, for the purposes of this description and the claims that follow, communications between the management component 210 and a particular mobile drive unit 106 may represent communication between components of a particular mobile drive unit 106.

The inventory holders 104 store inventory items. Inventory items may comprise any objects suitable for storage, retrieval, and/or processing by the system 200. In one example, inventory items may comprise completed orders, groups of items, and/or kits. In a particular embodiment, the inventory holders 104 include multiple storage bins with each storage bin capable of holding one or more types of inventory items. In some examples, the storage bins (or each storage bin) may have a unique identifier associated with a unique identifier of a respective inventory holder 104. The inventory holders 104 are capable of being carried, rolled, and/or otherwise moved by the mobile drive units 106. In some embodiments, some of the inventory holders 104 may be attached to each other.

In an example implementation, the system 200 may be implemented by a mail or online order warehouse facility, and inventory items may comprise merchandise stored in the warehouse facility. During operation, the mobile drive units 106 may retrieve inventory holders 104 containing one or more inventory items requested in an order to be packed for delivery to a customer. Moreover, in particular embodiments of the system 200, boxes containing completed orders may themselves represent inventory items.

As another example, the system 200 may be implemented by a merchandise-return facility. In such an embodiment, inventory items may represent merchandise returned by customers. Units of these inventory items may be stored in the inventory holders 104 when received at the workspace 202. At appropriate times, a large number of units may be removed from a particular inventory holder 104 and packed for shipment back to a warehouse or other facility. For example, individual units of a particular inventory item may be received and stored in the inventory holders 104 until a threshold number of units of that inventory item have been received. The mobile drive units 106 may then be tasked with retrieving an inventory holder 104 in this state. The inventory holder 104 may then be shipped to another facility, such as a mail-order warehouse.

As another example, the system 200 may be implemented by an airport luggage facility. In such an embodiment, inventory items may represent pieces of luggage stored in the luggage facility. The mobile drive units 106 may retrieve inventory holders 104 storing luggage that is arriving and/or departing on particular flights or luggage that is destined for particular types of processing, such as x-ray or manual searching.

As yet another example, the system 200 may be implemented by a manufacturing facility, and inventory items may represent individual components of a manufacturing kit. More specifically, inventory items may represent components intended for inclusion in an assembled product, such as electronic components for a customized computer system. In such an embodiment, the system 200 may retrieve particular components identified by a specification associated with an order for the product so that a customized version of the product can be built.

More generally, the system 200 may be implemented by or within any facility or system for storing and processing inventory items, and inventory items may represent objects of any type suitable for storage, retrieval, and/or processing in a particular system 200. In addition, the system 200 and the techniques described herein may apply in any environment in which it may be advantageous to move individual, unmanned drive units about an environment.

The workstations 110 may comprise locations designated for the completion of particular tasks involving inventory items. Such tasks may include the removal of inventory items from the inventory holders 104, the introduction of inventory items into the inventory holders 104, the counting of inventory items in the inventory holders 104, the decomposition of inventory items (e.g. from pallet or case-sized groups to individual inventory items), and/or the processing or handling of inventory items in any other suitable manner. In particular embodiments, the workstations 110 may represent the physical locations where a particular task involving inventory items can be completed within the workspace 202. In alternative embodiments, the workstations 110 may represent both the physical location and also any appropriate equipment for processing or handling inventory items, such as scanners for monitoring the flow of inventory items in and out of the system 200, communication interfaces for communicating with the management component 210, and/or any other suitable components.

The workstations 110 can be controlled, entirely or in part, by human workers or may be fully automated. Moreover, the human or automated operators of the workstations 110 may be capable of performing certain tasks with respect to inventory items, such as packing or counting inventory items, as part of the operation of the system 200.

The workspace 202 may include an area associated with the system 200 in which the mobile drive units 106 can move and/or the inventory holders 104 can be stored. For example, the workspace 202 may represent all or part of the floor of a mail-order warehouse in which the system 200 operates. Although FIG. 2 shows an embodiment of the system 200 in which workspace 202 includes a fixed, predetermined, and finite physical space, particular embodiments of the system 200 may include unmanned mobile drive units 106 and inventory holders 104 that are configured to operate within a workspace 202 that is of variable dimensions and/or an arbitrary geometry. Also, while the workspace 202 may be enclosed in a building, alternative embodiments may utilize workspaces 202 in which some or all of the workspace 202 is located outdoors, within a vehicle (such as a cargo ship), or otherwise unconstrained by any fixed structure. Moreover, in particular embodiments, the workspace 202 may include multiple portions that are physically separated from one another, including but not limited to separate floors, rooms, buildings, and/or portions divided in any other suitable manner.

When moving the inventory holders 104 to different locations within the workspace 202, the mobile drive units 106 may dock with and transport the inventory holders 104. The mobile drive units 106 may dock with the inventory holders 104 by connecting to, lifting, and/or otherwise interacting with the inventory holders 104 or in any other suitable manner so that, when docked, the mobile drive units 106 are coupled to and/or support the inventory holders 104 and can move the inventory holders 104 within the workspace 202. While the description below focuses on particular embodiments of the mobile drive unit 106 and inventory holder 104 that are configured to dock in a particular manner, alternative embodiments of mobile drive unit 106 and inventory holder 104 may be configured to dock in any manner suitable to allow the mobile drive unit 106 to move an inventory holder 104 within the workspace 202. Additionally, as noted below, in particular embodiments the mobile drive units 106 may represent all or portions of the inventory holders 104. In such embodiments, the mobile drive units 106 may not dock with inventory holders 104 before transporting the inventory holders 104 and/or the mobile drive units 106 may each remain continually docked with a particular inventory holder 104.

Figure 3:
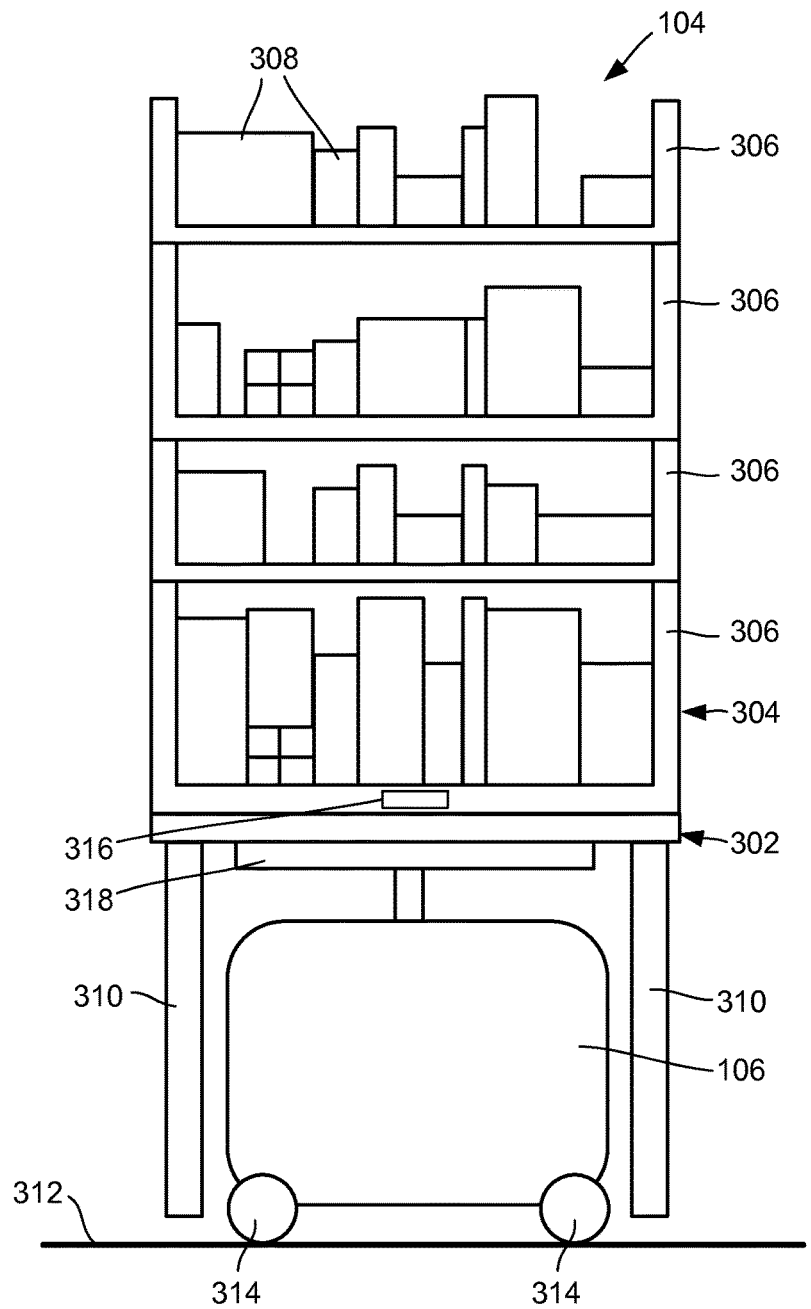
FIG. 3 is a side view showing an example inventory holder and mobile drive unit that may be used in the systems of FIGS. 1 and 2.

FIG. 3 illustrates an example implementation of an inventory holder 104 and a mobile drive unit 106. The inventory holder 104 includes a base or base portion 302 and a storage portion 304. The storage portion may comprise one or more bins or shelves 306. The bins or shelves 306 may be formed integrally with the base 302 and with each other, or may comprise separate stackable trays that are detachable from each other and/or from the base portion 302. In some embodiments, the inventory holder 104 may be expandable and/or collapsible. For example, the bins or shelves 306 may be expanded from a collapsed position where the bins or shelves 306 are in a non-use position (e.g., closed and not arranged to hold or store inventory items) to an expanded position where the bins or shelves 306 are in a use position (e.g., open and arranged to hold or store inventory items).

In some embodiments, the storage portion may have connection points, such as holes, hooks, etc., suitable for use by a manned lift such as a forklift or other drive lift. For example, the storage portion may have slots or hooks for engagement by a forklift or other equipment. In embodiments where the base portion 302 and storage portion 304 are integral, lifting the storage portion 304 by the slots or hooks will also lift the base portion 302. In embodiments where the base portion 302 and the storage portion 304 are detachable, lifting the storage portion 304 by the slots or hooks may separate the storage portion 304 from the base portion 302 so that the storage portion may be moved independently of the base portion 302. In some embodiments, some of the storage bins 306 may be attached to each other. In some embodiments, some of the portable inventory holders 104 may be attached to each other.

A plurality of inventory items 308 are held or stored by the bins or shelves 306. In some cases, the bins or shelves 306 may have adjustable dividers to provide separate spaces for different inventory items on individual bins or shelves 306. In some examples, the storage bins 306 (or each storage bin 306) may have a unique identifier 316, which in some instances may be associated with a unique identifier of a respective inventory holder 104.

In some embodiments inventory holders 104 include fabric pods. In such embodiments, storage portion 304 and/or the bins or shelves 306 can include one or more fabric bin arrays. In some embodiments, the fabric bin array of an inventory holder 104 may be attached to at least another fabric bin array of another inventory holder 104 adjacent to the inventory holder 104. The rectangular fabric bin array attached to the other rectangular fabric bin array may define an array of arrays of fabric bins.

The inventory holder 104 or the base portion 302 of the inventory holder 104 may have a plurality of legs 310 that extend downward from the base 302 to support the inventory holder on a floor or surface 312 of an inventory facility 102 and/or transport vehicle 112. The legs 310 provide a space above the floor 312 and between each other so that the mobile drive unit 106 can maneuver itself beneath the base portion 302. While FIG. 3 illustrates the inventory holder 104 including a base or base portion 302, the inventory holder may omit a base or base portion 302. For example, the inventory holder 104 may include three or more posts that may support the one or more bins or shelves and the three or more posts may rest on the floor 312. Moreover, the three or more posts may provide a space above the floor 312 and between each other so that the mobile drive unit 106 can maneuver itself beneath the storage portion 304. For example, the three or more posts may extend past a structural member (e.g., a crossbeam(s) or a cable(s)) arranged below the storage portion so that the mobile drive unit 106 can maneuver itself beneath the structural member.

The mobile drive unit 106 may comprise a motorized lift having a plurality of wheels 314 and a lift mechanism 318. The lift mechanism may be a surface, a projection(s) (e.g., a tooth, a tang, a tongue, a pin), a coupling (e.g., a self-locking joint), etc. One or more of the wheels 314 may be driven to move the drive unit 106 over the floor or surface 312. One or more of the wheels 314 may be steerable to guide the drive unit 106 in different directions or paths.

The lift surface 318 may be configured to dock with the inventory holder 104 by raising the lift surface 318 into engagement with the base 302. In operation, the mobile drive unit 106 may be configured to maneuver itself beneath the inventory holder 104, to raise the inventory holder 104 off of the surface 312 and to move the inventory holder 104 to any desired location under the direction of or in response to instructions from the management component 210. After reaching the desired location, the mobile drive unit 106 undocks from the inventory holder 104 by lowering the lift surface 318 and thereby placing the inventory holder 104 back on the floor 312.

Although FIG. 3 illustrates a particular embodiment of mobile drive unit 106 containing certain components and configured to operate in a particular manner, the mobile drive unit 106 may comprise any appropriate component and/or collection of components configured to transport and/or facilitate the transport of inventory holders 104.

As described above, the mobile drive units may include at least one imaging device, e.g., a camera, which is aimed toward a predefined surface, such as a floor surface, a wall surface, a ceiling surface, or the like. In one particular example, a mobile drive unit 106 may include a camera pointed substantially downwards towards to a floor surface. The unit 106 may capture images of the floor surface and may compare these images to a pre-existing map to identify the unit's location within a facility as well as to determine how to navigate to other locations in the facility. As such, the floor surface may include an image, which may be painted on, etched in, or otherwise formed within or applied to the floor surface. For instance, the image may be based on multiple different colors painted or applied to the floor, etchings in the floor, natural non-uniform textures of a particular material from which the floor has been made, and/or combinations thereof.

In some embodiments, inventory holders 104 include fabric pods that may be used for storing and transporting inventory. The fabric pods may be constructed with one or more fabric bin arrays of any suitable combination of fabric or fabric-like material, such as woven material, nonwoven material, Tyvek®, vinyl, canvas, cotton, plastic, nylon, or composites, other flexible materials including natural fibers such as bamboo, silk, wool or others, animal hides/skins, or plant-based materials such as coconut husks, palm leaves or others. The base portion and storage portion may be constructed with structural elements of any suitable combination of structural material such as steel, aluminum, carbon-based products, plastics, fiberglass, wood, composite and any other suitable structural materials. In some examples, a fabric pod may be a shelving unit that is made of one or more of: a structural base, corner posts of a structural material, removable structural crossbeams at the top, removable structural supports, crossbeams, and/or tubes at the top constructed from one or more structural materials, and at least one fabric bin array constructed from one or more fabric or fabric-like materials. In some implementations, the fabric wraps around the corner posts and is supported at the top with structural components.

In some examples, an assembly process involves sliding the fabric onto the posts and then hanging the assembly onto crossbeams at the top using clips and/or by sleeves in the fabric. Such fabric pods may provide for quick and efficient assembly. By having the structural, e.g., steel, support on the top and at the posts, the assembly may have a firm shape and be capable of holding and supporting a large amount of weight. Furthermore, the associated capacity may be larger and more flexible than traditional storage products. Moreover, the associated functional storage space may be greater than traditional rigid storage structures such as steel or plastic storage structures.

In some instances, the fabric pod includes a fabric bin array that has bins (or shelves) for holding product. A bin can be up to any width or height within the envelope of the fabric pod. Thus, the fabric pod may store items of various sizes, shapes, and weights. Furthermore, in some examples, the fabric pod can be built to have any suitable bin size on any face or side. For example, one side of a fabric pod may have a different number and different sizes of bins than a different side.

Furthermore, in some examples, different combinations of materials, colors, bin sizes, and fabric pod sizes may be used to increase the functionality and efficiency of fabric pods. For example, different combinations of the above characteristics may be used to depict shelf height, product location, labeling, and other storage-related aspects for product. For example, the fabric pod may include a first row or column of fabric bins associated with a first color and a second row or column of fabric bins associated with a second color different from the first color, and a user (e.g., an operator or human worker) may identify the first row or column or the second row or column based on the first and/or second colors to obtain an inventory item contained in a fabric bin arranged in the first row or column of fabric bins or in the second row or column of fabric bins. Furthermore, in some examples, a fabric pod itself can be a color associated with an inventory item. For example, fabric pods may be different colors depending on the type of inventory items each fabric pod may be designated to contain. For example, a fabric pod may be a particular color indicating a high value item, a hazardous material item, a fragile item, a perishable item, etc.

Thus, the fabric pod may be configurable for any product and can be configured, manufactured, assembled, or pre-assembled (e.g., prefabricated) to have multiple bin arrays that are suitable for different types of inventory. In some instances, the fabric edges of fabric pods can prevent or reduce injuries to lower rates than those associated with non-fabric pods (e.g., metal-based edges). Furthermore, in some examples, a fabric pod can be reconfigured by replacing or modifying the fabric, while retaining the same structure. Thus, fabric pods may be changed based on changing inventory sizes or quantities.

Figure 4:
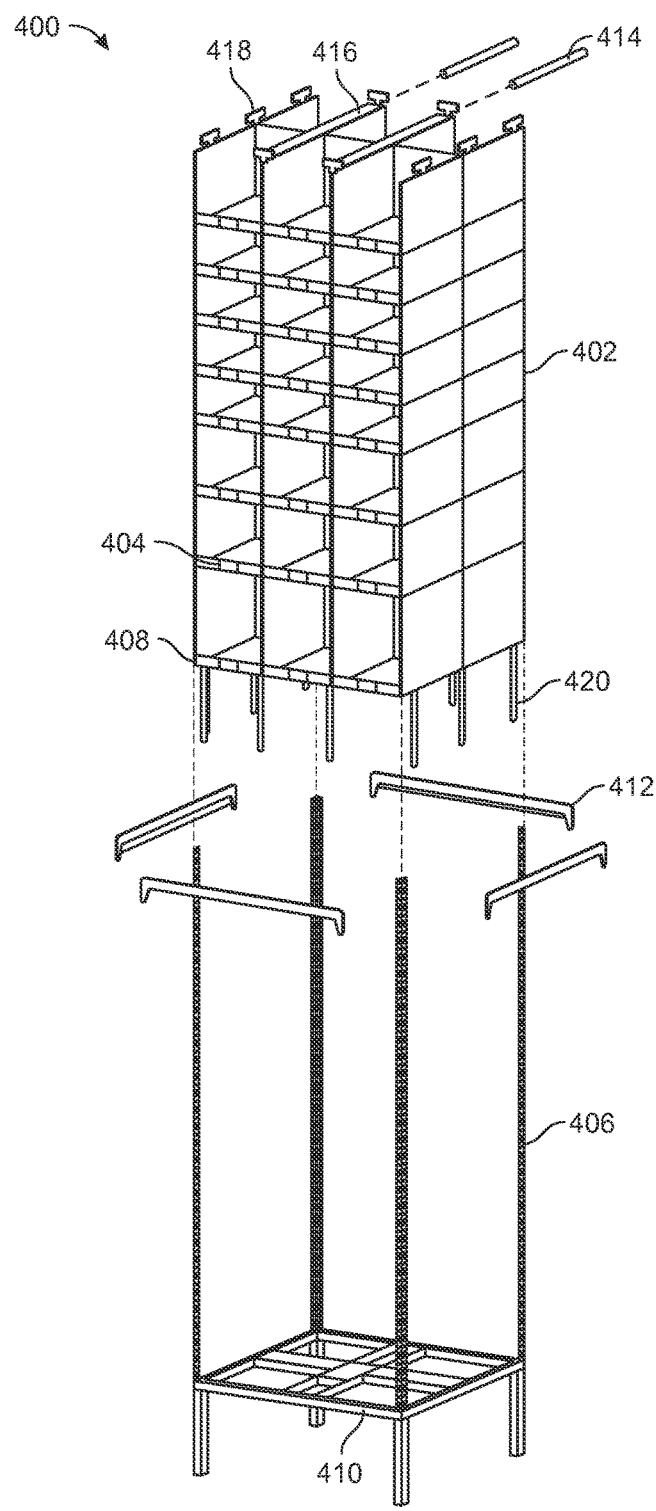
FIG. 4 illustrates an exploded, perspective view of an example fabric pod.

FIG. 4 illustrates an exploded, perspective view of an example fabric pod 400. In some examples, the fabric pod 400 may be a type of the inventory holder 104 of FIG. 3. Thus, the fabric pod 400 may be suitable for being handled by a mobile drive unit, such as the mobile drive unit 106 of FIG. 3.

As illustrated, the fabric pod 400 includes fabric bin array 402. The fabric pod 400 may include more than one fabric bin array 402, such as a fabric bin array 402 on more than one side of the fabric pod 400. In the example, the fabric bin array 402 includes multiple bins on two sides of the fabric pod. The bins may be of one or more varying sizes. In some instances, each bin is approximately the same size. Furthermore, there may be any number of rows and columns of bins in the fabric bin array 402. In some examples, one or more individual bins of the fabric bin array 402 may have a unique identifier 404, which in some instances may be associated with a unique identifier of the fabric pod 400. In some example, one or more individual bins of the fabric bin array 402 may have a door, a drawer, or an elastic band(s) that may contain the one or more inventory items within the individual bin.

In the illustrated example, the fabric bin array 402 slides onto four posts 406 of approximately equal height via sleeves 408 along the four corners of the fabric bin array 402. In other examples, clips, loops, magnets, glue, or any other suitable attachment method may be used. Thus, a different portion of the fabric bin array 402 wraps around each of the posts 406.

The posts 406 are each attached to a respective corner of a base 410. The base 410 is rectangular in the illustrated example. In some examples, the base may be polygonal (e.g., square, triangular, rhombus), curvilinear (e.g., circular, oval), have rounded edges, or be any other suitable shape. Furthermore, four crossbeams 412 are illustrated configured to be attached to a top portion of each of the four posts 406 to form the rectangle. Thus, each of the four crossbeams 412 supports a respective portion of the fabric bin array. Furthermore, the four crossbeams 412 may be tubes, solid beams, wires, or any other suitable structure for supporting the middle portion of the fabric bin array 402. In some embodiments there may be more or less than four crossbeams 412.

In some instances, one or more additional top supports or crossbeams 414 are attached to two of the four crossbeams 412. Thus, the additional crossbeams 414 support a middle portion of the fabric bin array 402. In some examples, the one or more additional crossbeams 414 are attached to two of the four crossbeams 412 via sleeves 416 at the top of the fabric bin array 402. In some examples, clips, loops, magnets, glue, or any other suitable attachment method may be used. Furthermore, the additional crossbeams 414 may be tubes, solid beams, wires, or any other suitable structure for supporting the middle portion of the fabric bin array 402. In some examples, clips 418 fixed to the fabric bin array 402 may attach to one or more of the four crossbeams 412 to support a respective portion of the fabric bin array. In some instances, one or more straps 420 fixed to the fabric bin array 402 may attach to a respective portion of the base 410 to support a respective portion of the fabric bin array.

Figure 5:
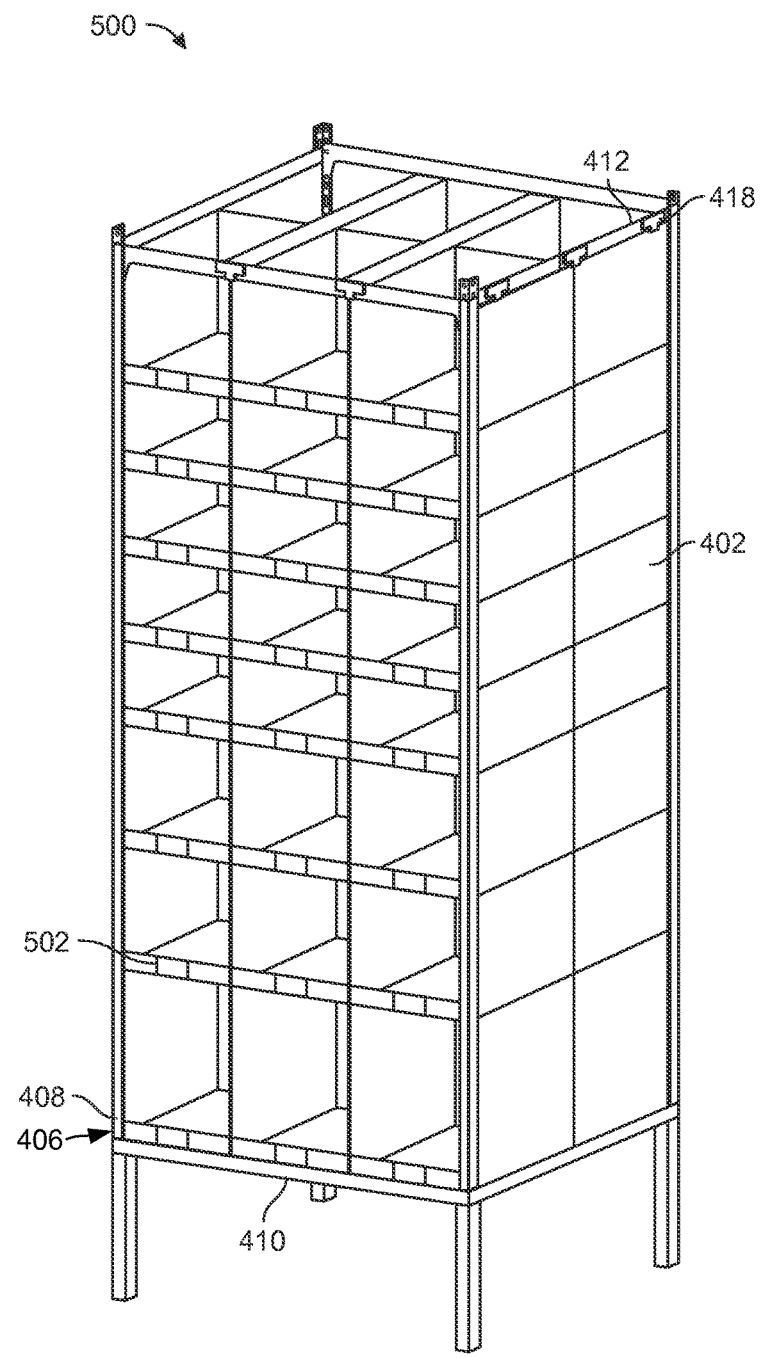
FIG. 5 illustrates a perspective view of an assembled example fabric pod.

FIG. 5 illustrates a perspective view of an assembled example fabric pod 500. The fabric pod 500 is an example of the fabric pod 400 of FIG. 4. FIG. 5 illustrates the sleeves 408 attached to the four posts 406 and the clips 418 attached to the four crossbeams 412. Because the sleeves 408 attach to the four posts 406, the fabric bin array 402 covers the metal-based edges of the four posts 406 and prevents or reduces injuries to lower rates than those associated with exposed posts.

In some examples, the fabric pod 500 may include a label 502 on each bin. For example, the fabric bin array 402 may include labels 502 attached to a respective portion of the fabric bin array 402. One or more of the labels 502 may be associated with a label associated with the base 410 or frame. For example, during assembly of the fabric pod 500 an induction process may associate the labels 502 with the base 410. Moreover, the drive units 106 may interact with the labels 502. For example, the drive unit 106 may read an identifier, e.g., a fiducial marker, on the base 410 associated with the labels 502 to determine what fabric bin array 402 is associated with the fabric pod 500. Further, the labels 502 on each bin and/or the label associated with the base 410 or frame may be read by a workstation 110 and/or a human worker 108. The management component 210 may receive information regarding the labels 502 on each bin and/or the label associated with the base 410 or posts 406 making up a frame that was read by the drive unit 106, the workstation 110 and/or the human worker 108 to manage and maintain components of the fulfillment system 100.

Figure 6:
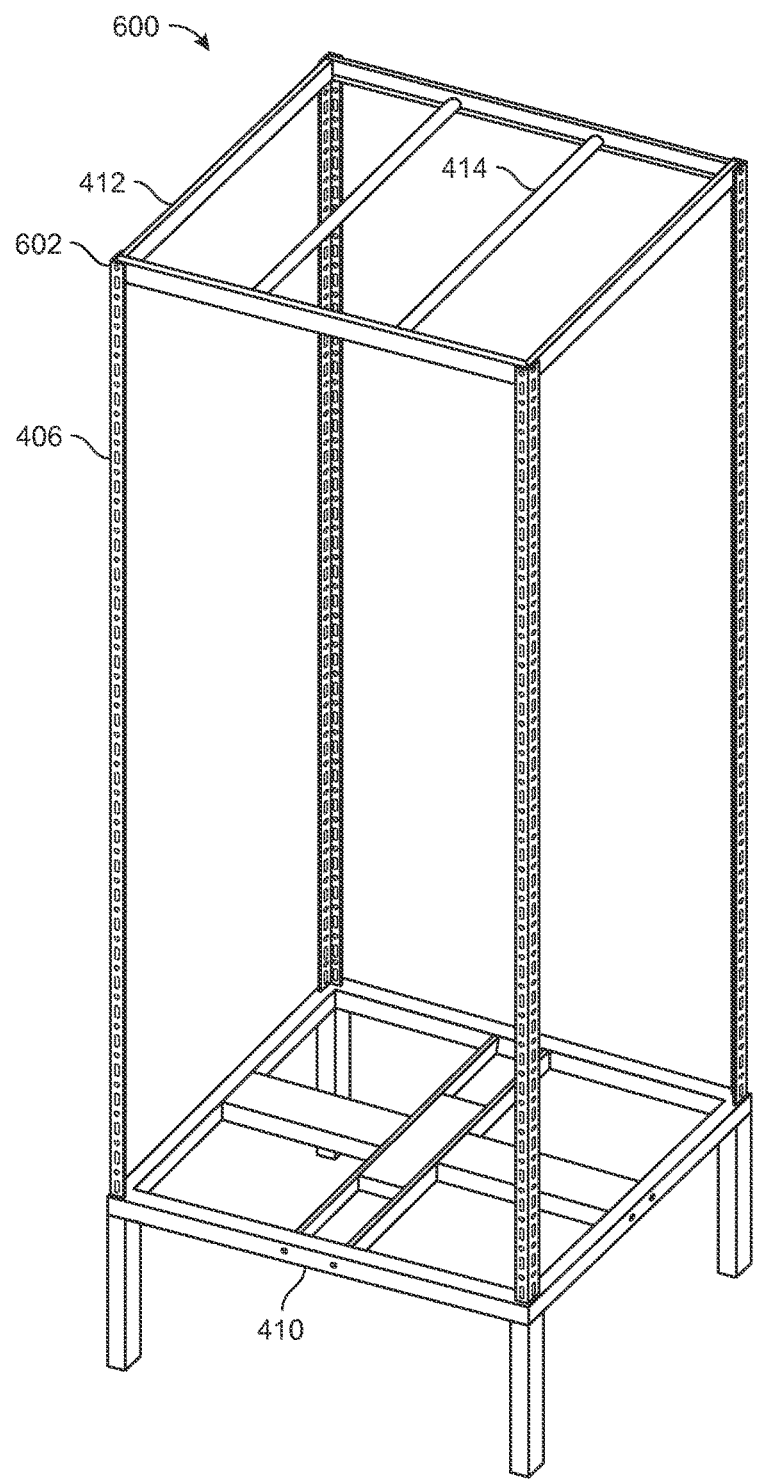
FIG. 6 illustrates a perspective view of portions of an example fabric pod.

FIG. 6 illustrates a perspective view of portions of an example structural portion or frame of fabric pod 600. The fabric pod portion 600 is an example of portions of the fabric pod 400 of FIG. 4. FIG. 6 illustrates the four crossbeams 412 attached to a top portion 602 of each of the four posts 406. The additional top supports or crossbeams 414 may be attached to two of the four crossbeams 412.

Figure 7:
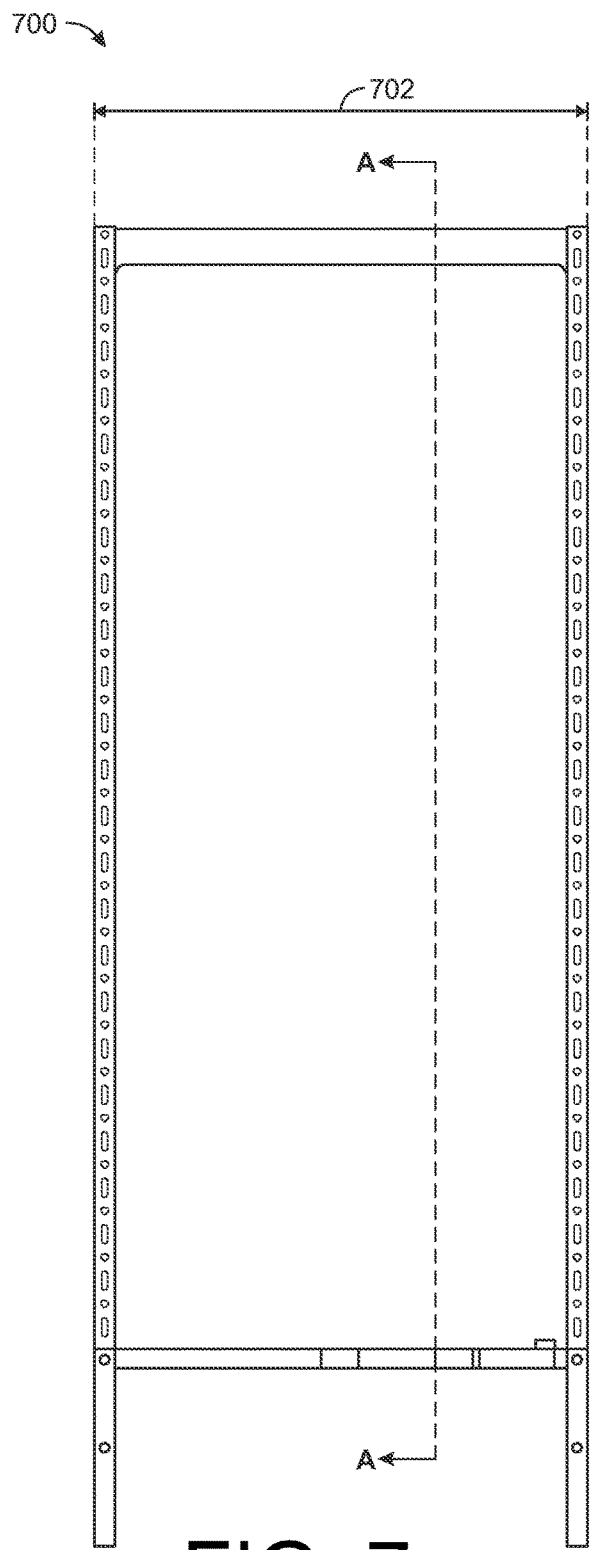
FIG. 7 illustrates an example cross-sectional view of portions of an example fabric pod.

FIG. 7 illustrates an example cross-sectional view of an example structural portion or frame of fabric pod 700. The fabric pod portion 700 is an example of a cross-sectional view of the fabric pod 400 of FIG. 4. In at least one embodiment, 702 represents a measurement of about 34¼ inches (872 mm).

Figure 8:
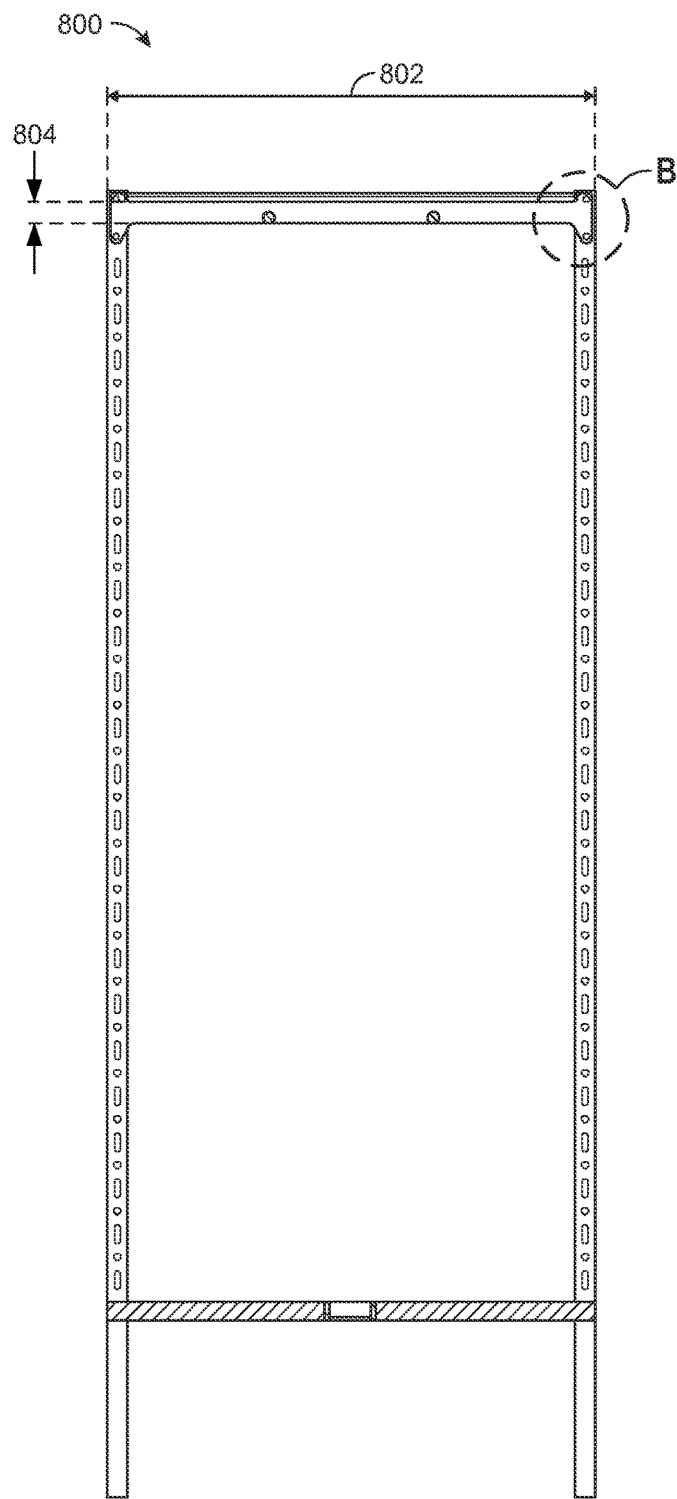
FIG. 8 illustrates a partial side, cross-sectional view of portions of the example fabric pod along section line A-A of FIG. 7.

FIG. 8 illustrates a partial side, cross-sectional view of the example structural portion or frame of fabric pod 700 along section line A-A of FIG. 7. In at least one embodiment, 802 represents a measurement of about 34¼ inches (872 mm) and 804 represents a measurement of about 1 inch (25 mm).

Figure 9:
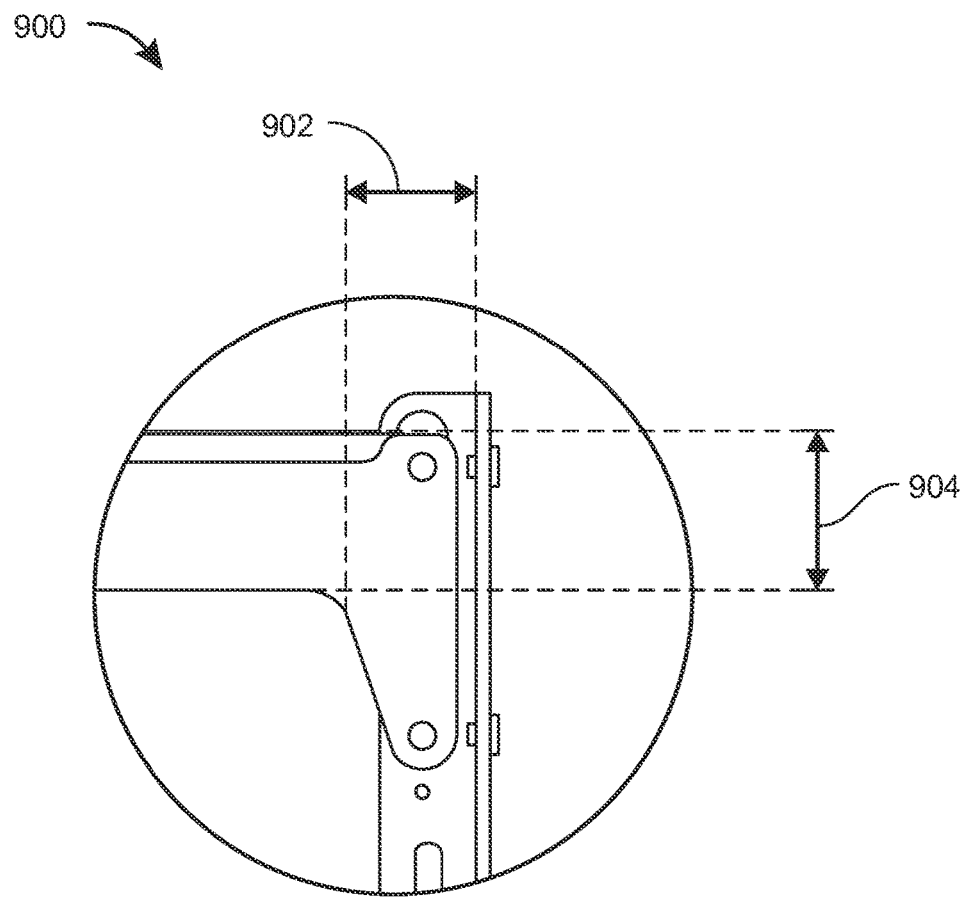
FIG. 9 illustrates a portion B of an example fabric pod portion of FIG. 8.

FIG. 9 illustrates a portion 900 corresponding to portion B of an example structural portion or frame of fabric pod 800 as illustrated in FIG. 8. In the illustrated example, the portion 900 is an example of an attachment of one of the four posts 406 to one of the four crossbeams 412 of FIG. 4. In at least one embodiment, 902 represents a measurement of about 1½ inches (38 mm) and 904 represents a measurement of about 1¾ inches (47 mm).

Figure 10:
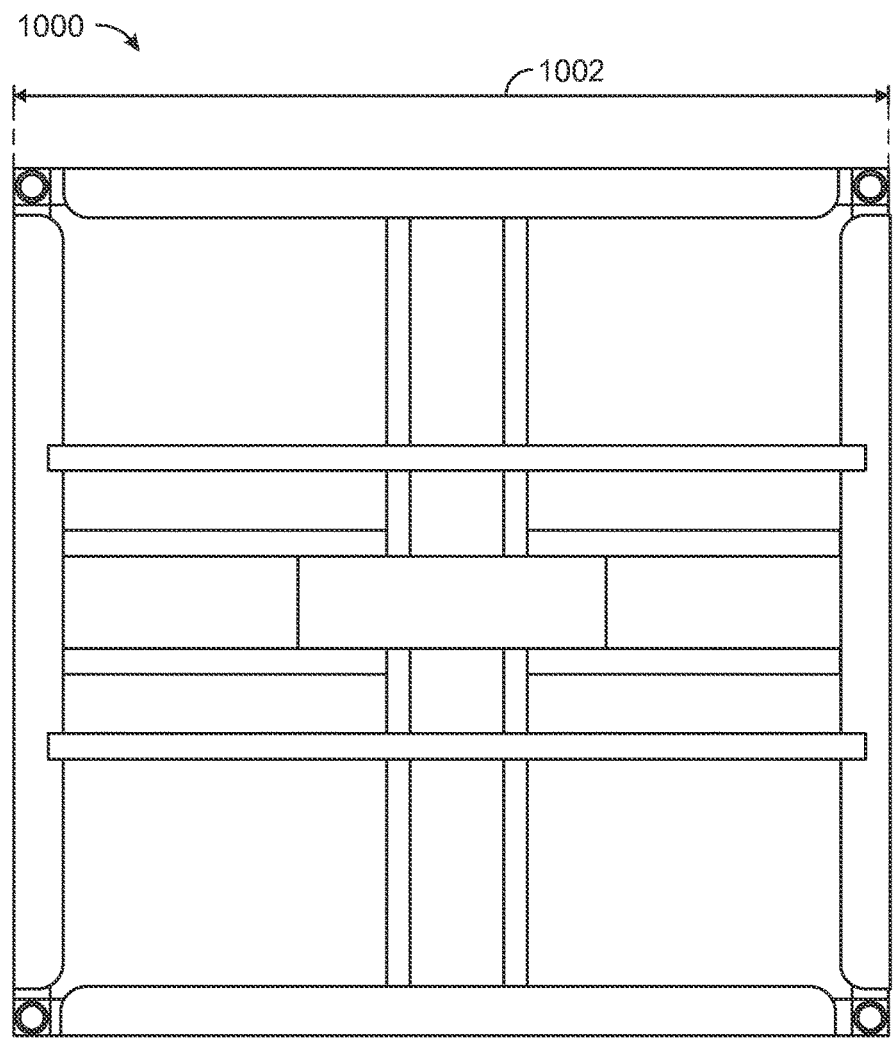
FIG. 10 illustrates a top view of portions of an example fabric pod.

FIG. 10 illustrates a top view of portions of an example fabric pod. In the illustrated example, the portion 1000 is an example of a top view of the fabric pod 400 of FIG. 4. In at least one embodiment, 1002 represents a measurement of about 34½ inches (876 mm) for the top support length. In another embodiment, 1002 can represent a measurement of about 32¼ inches (819 mm) for the top support length.

Figure 11:
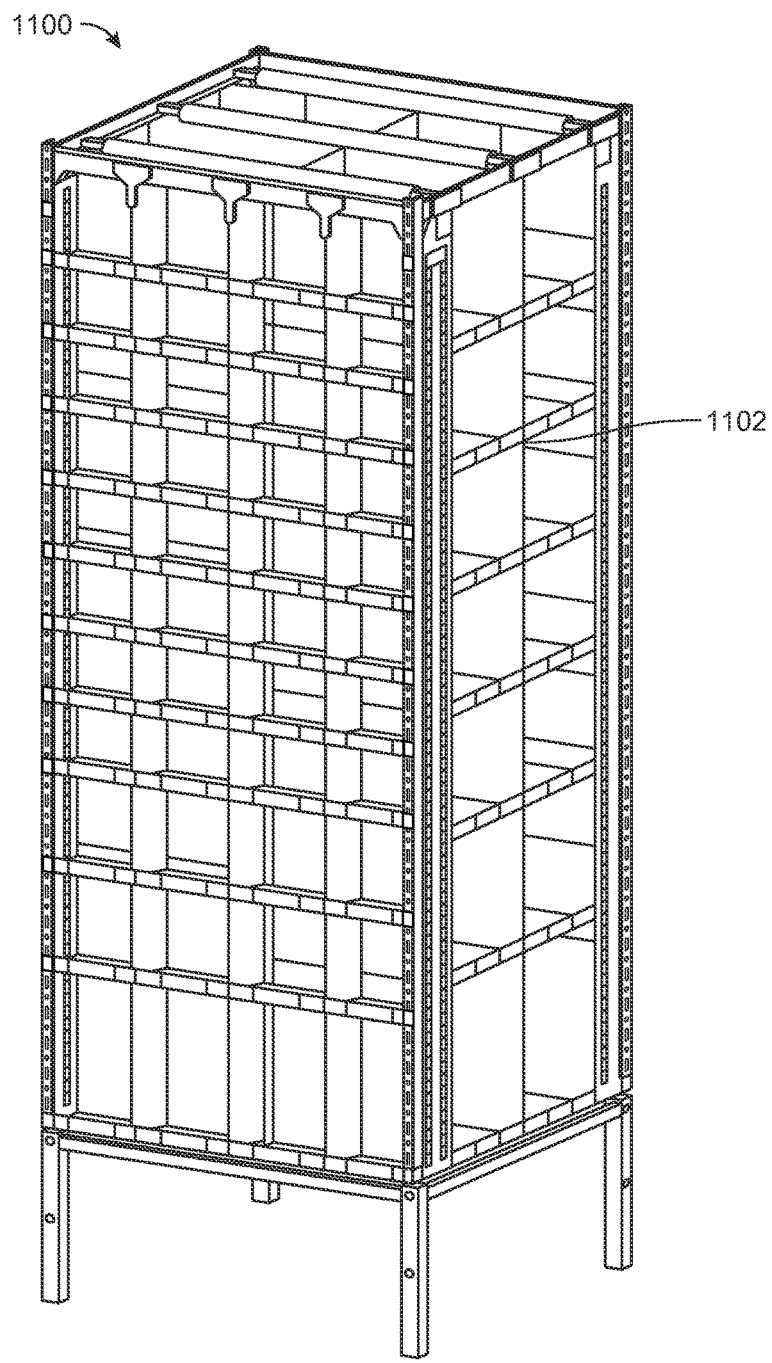
FIG. 11 illustrates a perspective view of an assembled example fabric pod.

FIG. 11 illustrates a perspective view of an assembled example fabric pod 1100, which in some examples represents another example of a fabric pod 400. As shown in FIG. 11, the fabric pod 1100 may include a fabric bin array 1102. The fabric bin array 1102 may include multiple bins arranged on two or more sides of the fabric pod 1100. The fabric bin array 1102 illustrates an example of multiple bins arranged in each of the four sides of the fabric pod 1100. The bins arranged in a respective side of the fabric pod 1100 may be of one or more varying sizes. In some instances, each bin is approximately the same size. In some instances, each bin in a row is approximately the same size. Furthermore, there may be any number of rows and columns of bins in each of the four sides of the fabric pod 1100.

EXAMPLE CLAUSES

A. A storage structure comprising: a rectangular base; four posts of approximately equal height, each of the four posts configured to attach to a respective corner of the base; a rectangular fabric bin array, wherein individual ones of four corners of the fabric bin array are configured to attach to a respective one of the four posts; and four crossbeams, individual ones of the four crossbeams configured to attach to a top portion of respective two adjacent posts of the four posts, the four crossbeams configured to support a respective portion of the fabric bin array to form a rectangle.

B. The storage structure as paragraph A recites, wherein the individual ones of the four corners of the rectangular fabric bin array are configured to attach to the respective one of the four posts by sliding a respective individual one of the four corners of the rectangular fabric bin array onto the respective one of the four posts.

C. The storage structure as paragraph A recites, wherein the individual ones of the four corners of the rectangular fabric bin array are configured with a sleeve to attach to the respective one of the four posts by sliding a respective sleeve of the rectangular fabric bin array onto the respective one of the four posts.

D. The storage structure as any one of paragraphs A through C recites, wherein the rectangular fabric bin array is formed from at least one of vinyl, canvas, cotton, plastic, or nylon and configured to attach to the four crossbeams.

E. The storage structure as any one of paragraphs A through D recites, wherein a mobile drive unit is engageable with the base, the mobile drive unit including a lift mechanism engageable with the base, the mobile drive unit maneuverable beneath the base to raise the rectangular base off of a surface and move the rectangular fabric bin array to a location based at least in part on one or more inventory items contained in the rectangular fabric bin array.

F. A storage structure comprising: a base; a plurality of posts of approximately equal height, each of the plurality of posts configured to attach to the base; a fabric bin array, wherein individual sections of the fabric bin array are configured to attach to a respective one of the plurality of posts; and at least one crossbeam configured to attach to a top portion of respective two adjacent posts of the plurality of posts, the at least one crossbeam configured to support a respective portion of the fabric bin array.

G. The storage structure as paragraph F recites, wherein the plurality of posts include at least one of "L" shaped posts or tubular posts constructed from at least one of steel, aluminum, composite, carbon fiber, or plastic.

H. The storage structure as paragraph F or G recites, wherein the at least one crossbeam includes at least two crossbeams, and further comprising a top support configured to attach to at least two of the crossbeams, wherein the top support is configured to support a portion of the fabric bin array.

I. The storage structure as paragraph H recites, wherein the fabric bin array is configured to attach to the top support.

J. The storage structure as paragraph H recites, wherein the fabric bin array is configured with at least one sleeve configured to attach to the top support.

K. The storage structure as paragraph H recites, wherein the fabric bin array is configured to attach to the top support with a clip.

L. The storage structure as any one of paragraphs F through K recites, wherein the fabric bin array includes at least one sleeve configured to attach to the at least one crossbeam.

M. The storage structure as any one of paragraphs F through K recites, wherein the fabric bin array is configured to attach to the at least one crossbeam with a clip.

N. The storage structure as any one of paragraphs F through M recites, wherein the fabric bin array is configured to attach to at least another fabric bin array adjacent to the fabric bin array, the fabric bin array attached to the other fabric bin array defining an array of arrays of fabric bins.

O. A storage structure comprising: a base and a fabric pod arranged above the base, the fabric pod including one or more fabric bin arrays, the one or more fabric bin arrays to contain one or more inventory items; and a mobile drive unit having a lift mechanism engageable with the base, the mobile drive unit maneuverable beneath the base to raise the base and the fabric pod off of a surface and move the base and the fabric pod to a location based at least in part on the one or more inventory items contained in the one or more fabric bin arrays.

P. The storage structure as paragraph O recites, further comprising four legs of approximately equal height, each of the legs attached to a respective corner of the base to provide a space beneath the base and between each adjacent pair of the legs for the mobile drive unit to maneuver beneath the base.

Q. The storage structure as paragraph O or P recites, wherein the one or more fabric bin arrays are configurable relative to one or more inventory items to be contained therein.

R. The storage structure as any one of paragraphs O through Q recites, wherein the mobile drive unit is configured to select the fabric pod based at least in part on the configuration of the one or more fabric bin arrays that contain at least one inventory item to be packed for delivery to a consumer.

S. The storage structure as any one of paragraphs O through R recites, wherein at least one fabric bin array of the one or more fabric bin arrays includes a first row or column of fabric bins associated with a first color and a second row or column of fabric bins associated with a second color different from the first color, and wherein the first row or column or the second row or column is identifiable based on the first or second colors that indicate at least one inventory item to be packed for delivery to a consumer.

T. The storage structure as any one of paragraphs O through S recites, wherein at least one fabric bin array of the one or more fabric bin arrays includes a plurality of rows or columns of fabric bins, and each fabric bin includes a unique identifier associated with a unique identifier of the base.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A storage structure comprising:
    a rectangular base;
    four vertical posts of approximately equal height, each of the four vertical posts attach to and extending up from a respective corner of the base, wherein each of the four vertical posts includes a plurality of vertically spaced apertures;
    a rectangular fabric bin array defining a top side, a front side, a bottom side, a rear side and four corners, the rectangular fabric bin array including vertical sleeves disposed at the corners, each of the vertical sleeves attach directly to a respective one of the four vertical posts by sliding onto a respective one of the four vertical posts, such that each sleeve wraps around the respective vertical post; and
        four crossbeams, wherein pins extend from ends of each of the crossbeams and individual ones of the four crossbeams attach to a top portion of respective two adjacent vertical posts of the four vertical posts by inserting the pins of the corresponding crossbeams in the respective apertures of the respective vertical posts, the four crossbeams configured to support a respective top portion of the fabric bin array to keep the fabric bin array in an expanded storage position in the form of a rectangle; wherein the front side of the rectangular fabric bin array defines a plurality of columns and a plurality of rows of individual compartments which are configured to stored items therein.

2. The storage structure as recited in claim 1, wherein the rectangular fabric bin array is formed from at least one of vinyl, canvas, cotton, plastic, or nylon and configured to attach to the four crossbeams.

3. The storage structure as recited in claim 1, wherein a mobile drive unit is engageable with the base, the mobile drive unit including a lift mechanism engageable with the base, the mobile drive unit maneuverable beneath the base to raise the rectangular base off of a surface and move the rectangular fabric bin array to a location based at least in part on one or more inventory items contained in the rectangular fabric bin array.

4. The storage structure as recited in claim 1, wherein the plurality of vertical posts include at least one of "L" shaped posts or tubular posts constructed from at least one of steel, aluminum, composite, carbon fiber, or plastic.

5. The storage structure as recited in claim 1, further comprising a top support configured to attach to at least two of the crossbeams, wherein the top support is configured to support a portion of the fabric bin array.

6. The storage structure as recited in claim 5, wherein the fabric bin array is configured to attach to the top support.

7. The storage structure as recited in claim 5, wherein the fabric bin array includes at least one horizontal sleeve configured to attach to the top support.

8. The storage structure as recited in claim 5, wherein the fabric bin array is configured to attach to at least one of the crossbeams with a clip.

9. A storage structure comprising:
    a base;
    four vertical posts of approximately equal height, each of the four vertical posts attached to and extending up from a respective corner of the base, wherein each of the four vertical posts includes a plurality of vertically spaced apertures;
    a fabric pod arranged above the base, the fabric pod including one or more fabric bin arrays, wherein each fabric bin array defines a top side, a front side, a bottom side, a rear side and four corners, each fabric bin array including vertical sleeves disposed at the corners;
    wherein each fabric bin array is configured to contain one or more inventory items, wherein the one or more fabric bin arrays are configurable relative to the one or more inventory items to be contained therein, and the sleeves each attach directly to a respective one of the four vertical posts by sliding onto the respective one of the four vertical posts, such that each sleeve wraps around the respective vertical post;
    four crossbeams, wherein pins extend from ends of each of the four crossbeams and individual ones of the four crossbeams attach to a top portion of respective two adjacent vertical posts of the four vertical posts by inserting the pins of the corresponding crossbeams in the respective apertures of the respective vertical posts, the four crossbeams configured to support a respective top portion of the fabric bin array to keep the fabric bin array in an expanded storage position in the form of a rectangle; and
    four legs of approximately equal height, each of the legs attached to a respective corner of the bottom of the base to provide a space beneath the base and between each adjacent pair of the legs;
    wherein the front side of each fabric bin array defines a plurality of columns and a plurality of rows of individual bins which are configured to stored the inventory items therein.

10. The storage structure as recited in claim 9, further comprising a mobile drive unit having a lift mechanism engageable with the base, the mobile drive unit maneuverable beneath the base to raise the base and the fabric pod off of a surface and move the base and the fabric pod to a location based at least in part on the one or more inventory items contained in the one or more fabric bin arrays, and wherein the space beneath the base and between each adjacent pair of the legs is for a mobile drive unit to maneuver beneath the base.

11. The storage structure as recited in claim 10, wherein the mobile drive unit is configured to select the fabric pod based at least in part on the configuration of the one or more fabric bin arrays that contain at least one inventory item to be packed for delivery to a consumer.

12. The storage structure as recited in claim 9, wherein at least one fabric bin array of the one or more fabric bin arrays includes a first row or column of fabric bins associated with a first color and a second row or column of fabric bins associated with a second color different from the first color, and wherein the first row or column or the second row or column is identifiable based on the first or second colors that indicate at least one inventory item to be packed for delivery to a consumer.

13. The storage structure as recited in claim 9, wherein at least one fabric bin array of the one or more fabric bin arrays includes a plurality of rows or columns of fabric bins, and each fabric bin includes a unique identifier associated with a unique identifier of the base.

* * * * *